United States Patent [19]
Sliney et al.

[11] Patent Number: 5,425,568
[45] Date of Patent: Jun. 20, 1995

[54] VAN-TYPE VEHICLE SEAT WITH A SEATBACK-MOUNTED ARMREST

[75] Inventors: Thomas C. Sliney, Troy; James R. Abel, Birmingham, both of Mich.

[73] Assignee: General Motors Corporation, Detroit, Mich.

[21] Appl. No.: 225,859

[22] Filed: Apr. 11, 1994

[51] Int. Cl.⁶ .............................................. B60N 2/22
[52] U.S. Cl. ........................ 297/378.11; 297/359; 297/378.12; 297/411.32
[58] Field of Search ........... 297/378.1, 378.11, 378.12, 297/411.20, 411.32, 359

[56] References Cited

U.S. PATENT DOCUMENTS

| | | | |
|---|---|---|---|
| 3,001,821 | 9/1961 | Marechal | 297/378.12 X |
| 4,518,190 | 5/1985 | Kluting et al. | 297/378.12 X |
| 4,579,384 | 4/1986 | Sharod | 297/113 |
| 4,881,778 | 11/1989 | Stephenson et al. | 297/411.32 |

FOREIGN PATENT DOCUMENTS 3636223A 5/1988 Germany.
3701419A 7/1988 Germany.
3705769C 9/1988 Germany.

*Primary Examiner*—Peter R. Crown
*Attorney, Agent, or Firm*—Ernest E. Helms

[57] ABSTRACT

A vehicle seat is provided which, in a preferred embodiment, includes a seat bun platform, a seatback angularly inclined with respect to the bun platform and having a normal seating position and a folded forward position, an inertia latch mechanism having a first position allowing free forward angular movement of the seatback during normal conditions and a second position preventing forward angular movement of the seatback during excessive vehicle decelerations, and an armrest pivotally connected to the seatback having a first usage position and a second storage position wherein the inertia latch is locked in a second position whenever the armrest is in the first position.

2 Claims, 3 Drawing Sheets

VAN-TYPE VEHICLE SEAT WITH A SEATBACK-MOUNTED ARMREST

FIELD OF THE INVENTION

The field of the present invention is that of vehicle seating, especially that of van or vehicle seatings which have only two side doors and a rear row of seating.

BACKGROUND OF THE INVENTION

One of the customer convenience features now found on many vehicles is a folding armrest mounted to a seatback frame instead of having the armrest on the vehicle side door. This type of armrest mounting allows the armrest to rotate when the seatback is reclined to maintain armrest comfort with any seatback angle and is generally most cost effective. Many sport utility vehicles only have two side doors with two rows of seats. Whether or not the front row seating reclines is highly desirable to provide an inertia seatback so that when the seat is bent over to allow access to the rear of the vehicle, the occupant does not first have to release a manually-operable lock.

To allow the vehicle seatback to pivot forward without utilizing a manually-operable lock, there is what is termed an inertia latch mechanism. The inertia latch mechanism allows the seatback to be pulled forward under regular conditions, but in a sudden deceleration of the vehicle typically experienced in an accident, the latch locks the position of the seatback with respect to the remainder of the seat, preventing the seatback from pivoting forward in a crash condition. In instances where the armrest is connected to the vehicle door, inertia locks are suitable. However, when the armrest is pivotally mounted to the vehicle seatback such as in a "captain" chair, armrest loading may cause the inertia locking device to become unlatched during driving, which could possibly violate Federal Motor Vehicle Safety Standard 207 (FMVSS 207). It would be highly desirable to offer captain-type seating in the front row of van or sport utility vehicles which also has a pivotally-mounted armrest and an inertia latch feature for customer convenience in accessing the rear row seating of the vehicle.

SUMMARY OF THE INVENTION

The present invention meets the above-noted desires by providing a vehicle seat having an armrest connected to the seatback which also has a mechanism to ensure that the inertia latch is in a locked position whenever the armrest is being utilized. In a second preferred embodiment of the present invention, an inertia latch lockout mechanism is actuated by the presence of a seated occupant.

DESCRIPTION OF THE PREFERRED EMBODIMENT

Figure 1:
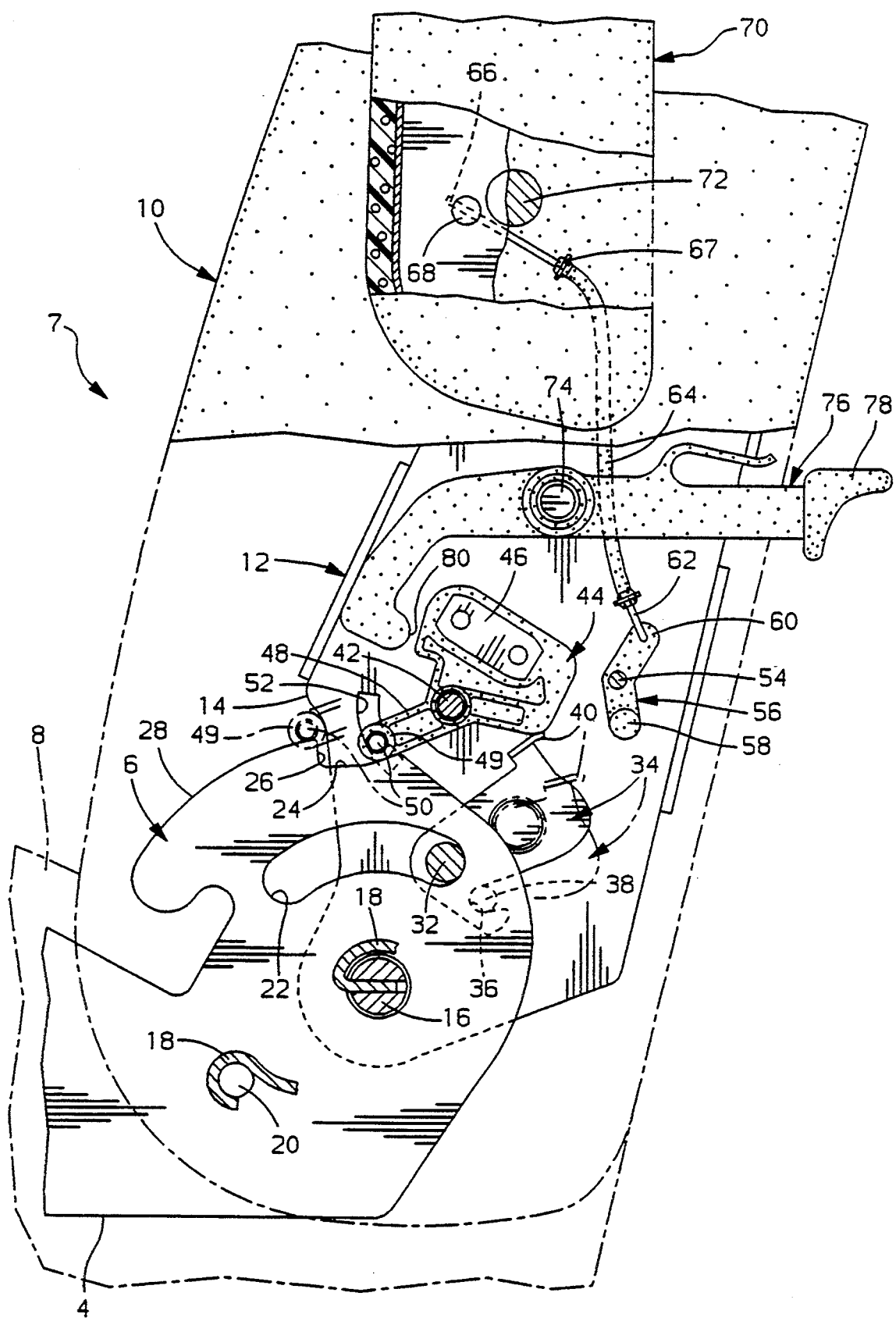
FIG. 1 is a side elevational view of a first preferred embodiment of the present invention showing the operation of the inertia latch when the vehicle seatback pivotally-mounted armrest is in an up storage position.
Figure 2:
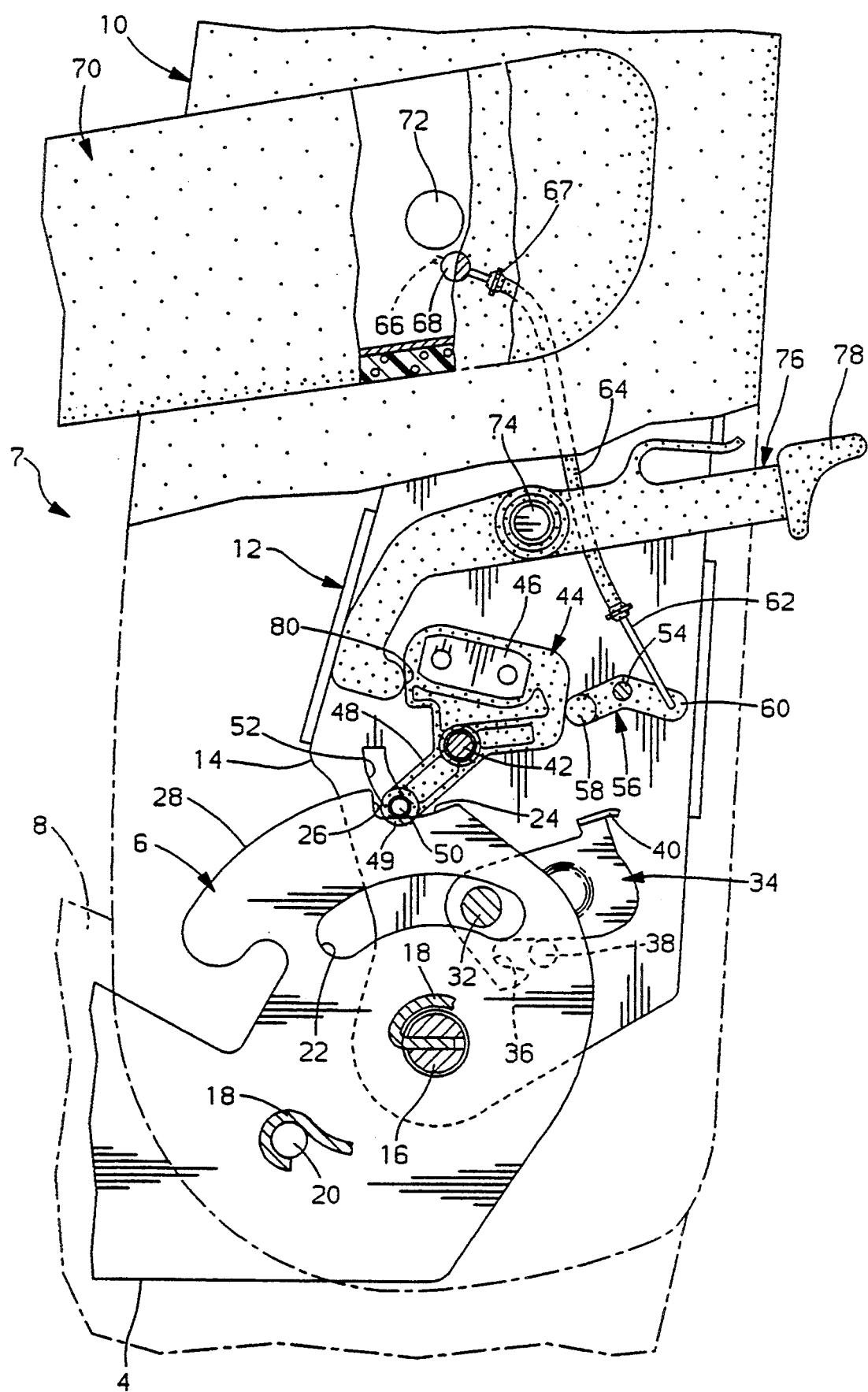
FIG. 2 is a view similar to that of FIG. 1 showing the present invention when the armrest is in the down usage position.

Referring to FIGS. 1 and 2, the inventive vehicle seat 7 according to the present invention has a seat bun 8. The seat bun 8 is supported by seat bun hardware having a side plate 4. The side plate has joined thereto a sector portion 6. Pivotally mounted to the seat bun 8 is a seatback 10. The seatback 10 may be a conventional seatback or a reclining seatback.

The seatback 10 is connected to a seatback bracket 12 via frame hardware (not shown). The seatback bracket 12 is comprised of two plates joined together having a cavity therebetween. In the seat shown in FIG. 1, the outboard plate has been removed for clarity of illustration to expose the other elements of the invention. However, the portion of the seatback bracket 12 not shown is outboard of the sector 6, thereby sandwiching the sector 6 between itself and an inner plate 14. The seatback bracket 12 is pivotally mounted with respect to the side plate 4 via a pin 16 and is biased to an upright position by a torsion spring 18 (a large portion of which has been removed for clarity of illustration) including an end which hooks on a pin 20 which is fixably connected with the sector 6.

The sector 6 has a slot 22 which is generally formed along the radius extending from the center of pin 16. The top edge of the sector 6 has a camming surface 24 with adjoining stop surface 26. A forward camming surface 28 is provided forward of the stop surface 26.

Pivotally mounted to the seatback frame bracket 12 by a pin 32 is prepositioning bracket 34. Pin 32 is captured within the slot 22. Positioning bracket 34 also has a pin receptacle surface 36 for contact with a stud or stamped depression 38 provided in the sector 6. The prepositioning bracket 34 also has a boot 40.

Pivotally connected to the bracket 12 by a pin 42 is an inertia pendulum or lever 44. The inertia pendulum 44 has a weight 46 attached thereto. The inertia pendulum 44 has an arm 48 with a transversely projecting pin 50. The pin 50 is captured within two radial stamped projecting alignment slots 52 stamped into the plate 14 and the top plate of the seatback bracket 12.

Pivotally mounted to the plate 14 via a pin 54 and operatively associated with the armrest 70 is a lockout lever 56. Lockout lever 56 has a pendulum contact end 58. An opposite end 60 of the lockout lever 56 is connected to a flexible rod 62 that is captured within a sheath 64. The sheath 64 is entirely embedded within the seatback 10. However, the rod 62 has an extreme end 66 affixed to a locating member 68 provided in an armrest 70 which is pivotally mounted to the seatback 10 by a pin 72.

Pivotally mounted to the plate 14 by a pin 74 is a knockout lever 76 having a handle 78. The knockout lever 76 has a contact end 80 for hitting the pendulum 44 for reasons to be explained later.

In the generally upright position, the seatback 10 will be inclined with the seat bun 8. The inclination rearwardly of the seatback bracket 12 with respect to the seat bun 8 is set by recliner mechanism (not shown). As shown, the seatback 10 is in its most upright normal seating position. Use of the recliner mechanism to recline the seatback 10 will also cause like angular movement of the sector 6. Movement of the sector 6 can only occur when utilizing the recliner mechanism.

As shown in FIG. 1, the armrest 70 is in its upright position wherein the rod end 66 is extended away from a top end 67 of the sheath 64, thereby pulling the locking lever end 60 counterclockwise around pin 54. The above ensures that contact end 58 of the locking lever is removed from contact with the pendulum 44. The prepositioning bracket 34, by virtue of contact with its surface 36 with the indention 38 and its pivotal positioning on pin 32, will cause its shoe 40 to preposition the pendulum 44 to ensure that the arm 48 rides on the surface 24. If a vehicle occupant desires to push the seatback 10 forwardly to gain access to the rear of the vehicle, the seatback bracket 12 will pivot forwardly against the biasing of spring 18, and an end 49 of the pendulum arm will initially ride along surface 24 of sector 6. As the seatback bracket continues its forward movement, the prepositioning bracket 34 rotates counterclockwise, thereby allowing the pendulum 44 to rotate clockwise, allowing pendulum end 49 to move upward in avoiding contact with stop surface 26 and to then ride on surface 28.

In a situation of sudden deceleration beyond a predetermined limit typically incurred in a crash situation, the weight 46 will urge the pendulum to rotate counterclockwise and prevent the pendulum end 49 from riding up the stop surface 26. Therefore, the seatback bracket cannot pivot forwardly with respect to the sector beyond the surface 26. If as a result of a crash the seatback bracket 12 becomes locked in position with the pendulum embedded in the surface 26, knockout lever 76 can be pulled upwardly, causing contact surface 80 to hit the pendulum 44 and allow the seatback to be released forwardly in an accident situation.

Referring to FIG. 2, if the armrest 70 is placed downward, the rod 62 will be extended downwardly to the sheath 64, causing the lockout lever 56 to rotated clockwise from the position shown in FIG. 1. The above motion causes the contact end 58 to push the pendulum to its locked downward position to where forward movement of the seatback 10 is totally prevented in any situation.

Figure 3:
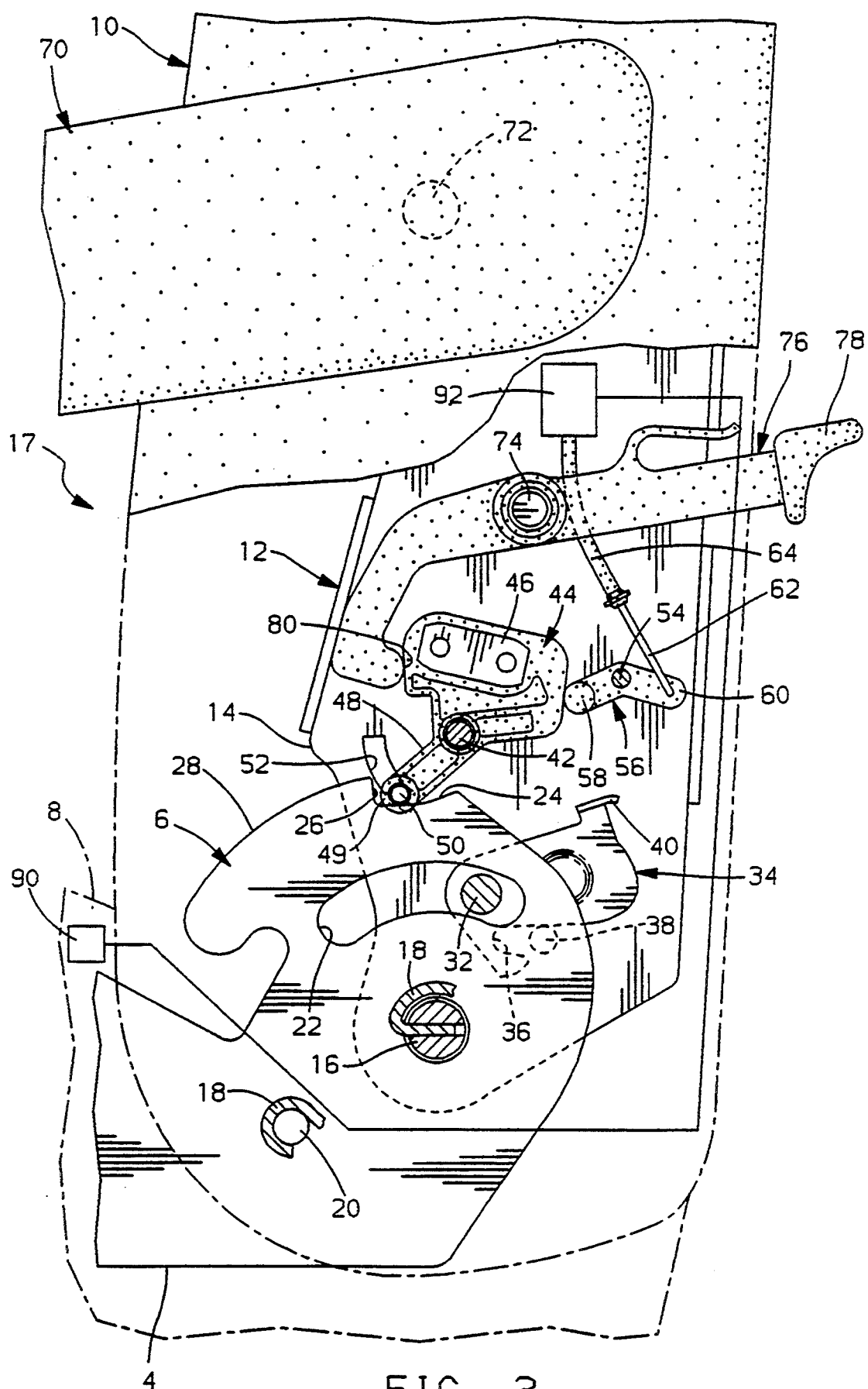
FIG. 3 is a view similar to FIGS. 1 and 2 showing an alternative preferred embodiment of the present invention which utilizes an occupant-sensing mechanism to actuate the locking out of the inertia locking mechanism.

Referring to FIG. 3, a second embodiment of the present invention is shown with similar items having identical reference numerals to those shown in FIG. 1. In FIG. 2, the embodiment 17 has a sensor 90 activated by heat, weight or other means which determines if the seat 17 is occupied. When the seat is occupied, the sensor 90 will signal a solenoid 92 to extend the rod 62 to actuate the lockout lever 56. It should be noted that with this embodiment, the armrest can be nonpivotal with respect to the seatback if desired. It is also apparent to those skilled in the art that a sensor (not shown) could be implanted in the armrest since the location of the armrest and the signal of the solenoid 92 accordingly will place the pendulum 44 in a locked position.

While this invention has been described in terms of a preferred embodiment thereof, it will be appreciated that other forms could readily be adapted by one skilled in the art. Accordingly, the scope of this invention is to be considered limited only by the following claims.

The embodiments of the invention in which an exclusive property or privilege is claimed are defined as follows:

1. A vehicle seat comprising:
   a seat bun platform;
   a seatback pivotally mounted with respect to the seat bun platform, the seatback being angularly inclined with respect to the bun platform, the seatback having a normal seating position and a folded forward position;
   an inertia latch including a pendulum pivotally connected with the seatback having a first position allowing free forward angular movement of the seatback during normal conditions and a second position preventing forward angular movement of the seatback during excessive vehicle decelerations;
   an armrest pivotally connected with respect to the seatback having a first usage position and a second storage position; and
   a lockout lever operatively interconnected with the armrest, the lockout lever imparting a force to the inertia latch pendulum to lock the inertia latch pendulum in said second position whenever the armrest is in the first position.

2. A vehicle seat as described in claim 1 wherein the lockout lever has a first position out of contact with an inertia lever and a second position locking the inertia lever in the locking position and wherein the lockout lever is connected to a cable connected with the armrest, the cable being actuated by moving the armrest from an upward second storage position or the first downward usage position.

* * * * *